(12) United States Patent  
Iguchi (10) Patent No.: US 7,125,617 B2  
(45) Date of Patent: Oct. 24, 2006

(54) METHOD OF OPERATING PHOSPHORIC ACID FUEL CELL

(75) Inventor: Masaru Iguchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 338 days.

(21) Appl. No.: 10/460,992

(22) Filed: Jun. 13, 2003

(65) Prior Publication Data

US 2004/0009377 A1    Jan. 15, 2004

(30) Foreign Application Priority Data

Jun. 14, 2002  (JP) .............................. 2002-174288

(51) Int. Cl.
*H01M 8/00* (2006.01)
*H01M 8/08* (2006.01)

(52) U.S. Cl. .......................... 429/13; 429/46
(58) Field of Classification Search ................ 429/13, 429/46, 22
See application file for complete search history.

(56) References Cited

U.S. PATENT DOCUMENTS

| 5,149,599 | A | 9/1992 | Kamoshita |
| 5,525,436 | A | 6/1996 | Savinell et al. ............ 429/30 |
| 6,103,410 | A | 8/2000 | Fuller et al. ............... 429/13 |

FOREIGN PATENT DOCUMENTS

| DE | 4132536 A1 | 9/1991 |
| EP | 1168474 A2 | 1/2002 |
| JP | 58087771 | 5/1983 |
| JP | 62-031956 | 2/1987 |
| JP | 62216174 | 9/1987 |
| JP | 63225477 A | 9/1988 |
| JP | 3-105870 A1 | 5/1991 |

OTHER PUBLICATIONS

Office Action in corresponding JP 2002-17428 dated Apr. 18, 2006.

*Primary Examiner*—Patrick Joseph Ryan
*Assistant Examiner*—Thomas H. Parsons
(74) *Attorney, Agent, or Firm*—Lahive & Cockfield, LLP; Anthony A. Laurentano, Esq.

(57) ABSTRACT

Before a phosphoric acid fuel cell generates electric energy, a cathode is supplied with a hydrogen gas (fuel gas) and air (oxygen-containing gas) to cause a reaction between hydrogen and oxygen. At this time, the hydrogen and the oxygen are caused to react with each other under a condition in which the concentration of phosphoric acid at the time the amount of water produced by the reaction (liquid water) for reducing the concentration of phosphoric acid and the amount of water evaporated from phosphoric acid are in equilibrium is equal to or greater than a reference phosphoric acid concentration which is capable of keeping the fuel cell at a desired performance level. The temperature of an electrolyte electrode assembly of the fuel cell is increased by the heat which is generated by the reaction.

7 Claims, 5 Drawing Sheets

METHOD OF OPERATING PHOSPHORIC ACID FUEL CELL

BACKGROUND OF THE INVENTION

1. Field of the Invention

The present invention relates to a method of operating a phosphoric acid fuel cell (PAFC) including an assembly which comprises an anode, a cathode, and an electrolyte layer impregnated with a phosphoric acid and interposed between the anode and the cathode.

2. Description of the Related Art

Each unit of the phosphoric acid fuel cell has an electrolyte electrode assembly comprising an anode, a cathode, and an electrolyte layer impregnated with phosphoric acid and interposed between the anode and the cathode. The matrix which is impregnated with phosphoric acid is generally made of porous body of silicon carbide. However, it has been proposed to use a basic polymeric membrane of polybenzimidazole or the like (see U.S. Pat. No. 5,525,436).

Usually, the phosphoric acid fuel cell includes a predetermined number of unit cells which are stacked together and electrically connected in series to form a stack body.

For operating the phosphoric acid fuel cell, the anode is supplied with a fuel gas (hydrogen-containing gas), and the cathode is supplied with an oxygen-containing gas. Hydrogen in the hydrogen-containing gas which is supplied to the anode is ionized by the anode according to the following formula (A), generating hydrogen ions and electrons:

$$2H_2 \rightarrow 4H^+ + 4e \quad \text{(A)}$$

The generated hydrogen ions move through the electrolyte layer to the cathode. The electrons are transmitted to an external circuit which is electrically connected to the anode and the cathode. After the electrons are used as a DC electric energy for energizing the external circuit, they reach the cathode.

The hydrogen ions that have moved to the cathode and the electrodes that have reached the cathode via the external circuit react with oxygen contained in the oxygen-containing gas supplied to the cathode according to the formula (B):

$$O_2 + 4H^+ + 4e \rightarrow 2H_2O \quad \text{(B)}$$

The electrochemical reaction is an exothermic reaction. Therefore, heat is generated in operating the fuel cell.

When the phosphoric acid fuel cell is operated at a temperature lower than 100° C. which is the boiling point of water, the ratio of $H_2O$ generated as a liquid (water) increases, and the generated water remains stagnant in the phosphoric acid fuel cell. Then, the phosphoric acid in the electrolyte layer is dissolved into the generated water, and discharged together with the generated water when the water is finally discharged out of the fuel cell. As a result, the concentration of the phosphoric acid in the electrolyte layer is lowered, degrading the cell characteristics of the phosphoric acid fuel cell.

The phosphoric acid fuel cell is usually operated in a temperature range from 140° C. to 190° C. in order to avoid the above drawback. Specifically, the phosphoric acid fuel cell is heated to a temperature above 100° C. by a heating means such as a heater. Thereafter, the fuel gas and the oxygen-containing gas are supplied to react as described above, and the fuel cell is further heated up to the temperature range from 140° C. to 190° C. with the heat generated by the reaction.

However, the above heating process is disadvantageous because it takes a long period of time until the phosphoric acid fuel cell reaches the operating temperature. The phosphoric acid fuel cell thus suffers a practical problem in that it cannot generate electric energy immediately when desired because it takes a long period time until the fuel cell becomes ready to operate stably in a steady state.

One solution would be to use a heater having a large heat-generating capability. However, such a heater would be large in size, make the overall fuel cell system also large in size, and greatly lower the energy efficiency per volume and weight.

Japanese laid-open patent publication No. 63-225477 and U.S. Pat. No. 6,103,410 disclose a process of supplying a fuel gas and an oxygen-containing gas simultaneously to a cathode of a fuel cell, causing a reaction represented by the formula (C) shown below, and heating the phosphoric acid fuel cell with the heat generated in the reaction:

$$2H_2 + O_2 \rightarrow 2H_2O \quad \text{(C)}$$

Even according to the above disclosed process, liquid water is generated when the temperature of the phosphoric acid fuel cell is lower than 100° C. Therefore, the phosphoric acid in the electrolyte layer is dissolved into the generated water, and discharged together with the generated water out of the fuel cell. Consequently, it is impossible to avoid the shortcoming that the cell characteristics of the phosphoric acid fuel cell are lowered simply by the reaction of hydrogen and oxygen.

SUMMARY OF THE INVENTION

It is a major object of the present invention to provide a method of operating a phosphoric acid fuel cell so as to be able to increase the temperature of the phosphoric acid fuel cell up to an operating temperature while reliably preventing the cell characteristics of the phosphoric acid fuel cell from being lowered, without increasing the size of a facility for operating the phosphoric acid fuel cell.

According to the present invention, there is provided a method of operating a phosphoric acid fuel cell having a assembly comprising an anode, a cathode, and an electrolyte layer impregnated with phosphoric acid and interposed between the anode and the cathode, the method comprising the steps of before generating electric energy from the phosphoric acid fuel cell, supplying a fuel gas and an oxygen-containing gas to the cathode to raise the temperature of the assembly to an operating temperature with heat generated by a reaction between hydrogen contained in the fuel gas and oxygen contained in the oxygen-containing gas at the cathode, and causing the hydrogen and the oxygen to react with each other under a condition in which the concentration of the phosphoric acid at the time the amount of water generated by the reaction and the amount of water evaporated from the phosphoric acid impregnated in the electrolyte layer are in equilibrium is equal to or greater than a reference phosphoric acid concentration which is capable of keeping the phosphoric acid fuel cell at a predetermined performance level.

By thus increasing the temperature of the assembly, the phosphoric acid is prevented from being dissolved. Accordingly, the phosphoric acid fuel cell has its electric energy generating capability prevented from being lowered, and can generate electric energy at a desired performance level after its temperature has risen to an operating temperature. The phosphoric acid fuel cell thus does not need any phosphoric acid replenisher or the like.

According to the present invention, as can be understood from the above description of the invention, the temperature of the assembly is increased by the heat produced when the hydrogen and the oxygen react with each other. Therefore, no large-size heater is required, making it possible to employ a simple and inexpensive fuel cell system for operating the phosphoric acid fuel cell.

For safety reasons, the fuel gas and the oxygen-containing gas should preferably be supplied to the cathode at respective proportions to keep the hydrogen and the oxygen out of an explosive range.

Specifically, for controlling the concentration of the phosphoric acid so as to be equal to or higher than the reference phosphoric acid concentration, a combustion efficiency of the fuel gas may be determined while the fuel gas is being supplied at a constant rate, and while the fuel gas is supplied at the rate for the known combustion efficiency, the rate at which the oxygen-containing gas is supplied may be changed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A method of operating a phosphoric acid fuel cell according to a preferred embodiment of the present invention will be described in detail below with reference to the accompanying drawings.

Figure 1:
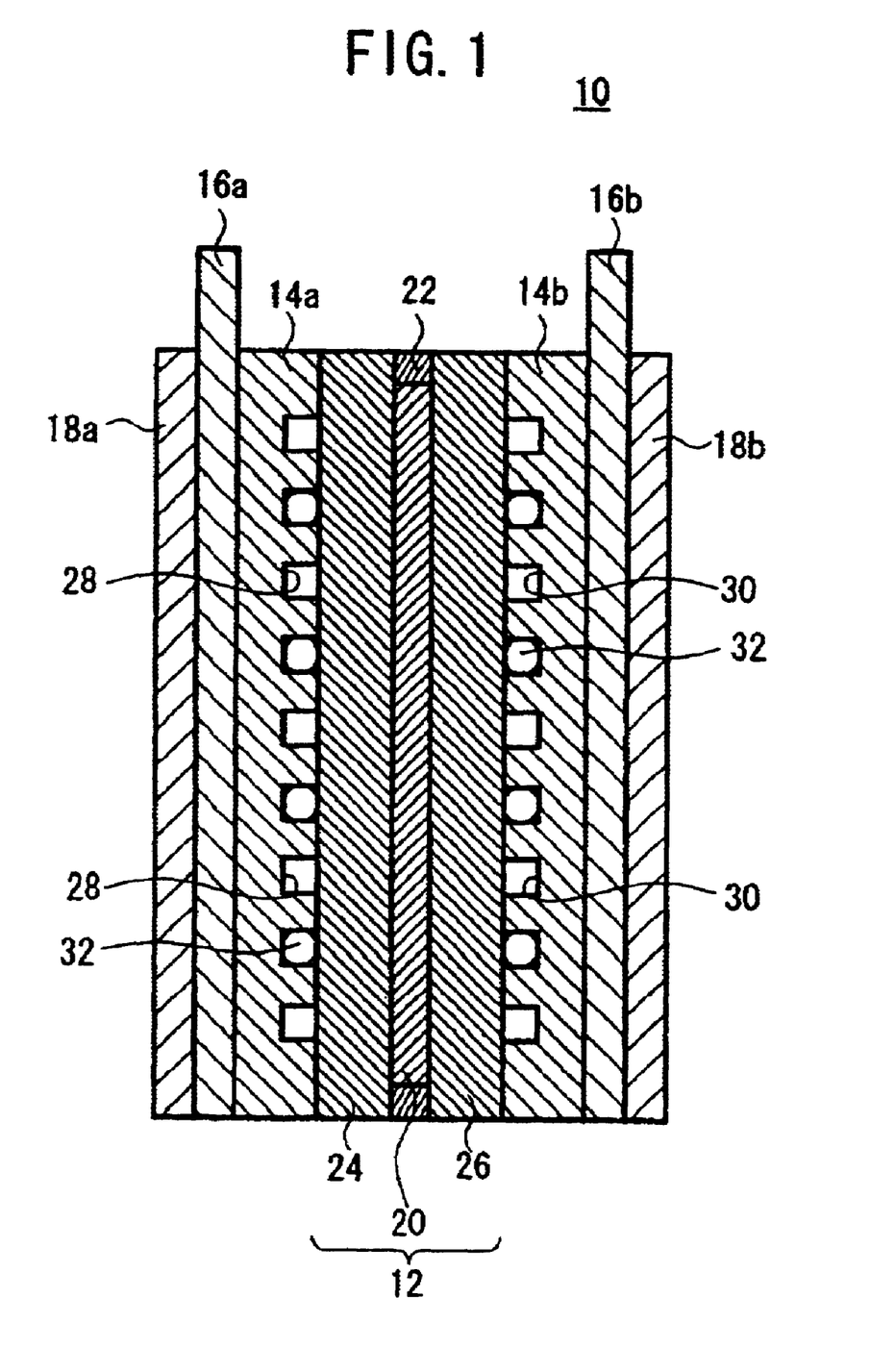
FIG. 1 is a vertical cross-sectional view schematically showing a phosphoric acid fuel cell which is operated by an operating method according to the present invention.

FIG. 1 schematically shows in vertical cross section a phosphoric acid fuel cell 10. As shown in FIG. 1, the phosphoric acid fuel cell 10 comprises an electrolyte electrode assembly 12, a pair of separators 14a, 14b as bipolar plates disposed on respective opposite surfaces of the electrolyte electrode assembly 12, and a pair of terminal plates 16a, 16b disposed on respective outer surfaces of the separators 14a, 14b.

End plates 18a, 18b are disposed on respective outer surfaces of the terminal plates 16a, 16b. The end plates 18a, 18b are tightened together by bolts (not shown) to form the phosphoric acid fuel cell 10.

The electrolyte electrode assembly 12 comprises an electrolytic matrix layer 20 having a basic polymeric membrane of polybenzimidazole or the like that is impregnated with phosphoric acid, and an anode 24 and a cathode 26 that are disposed on opposite surfaces of the electrolytic matrix layer 20 with a frame-like spacer 22 interposed between the anode 24 and the cathode 26.

First gas passages 28 for passing a fuel gas therethrough are defined in the surface of the separator 14a which faces the anode 24. Second gas passages 30 for passing an oxygen-containing gas therethrough are defined in the surface of the separator 14b which faces the cathode 26. A plurality of temperature sensors 32 are disposed in the boundary surfaces of the separators 14a, 14b which are facing the anode 24 and the cathode 26, respectively.

Figure 2:
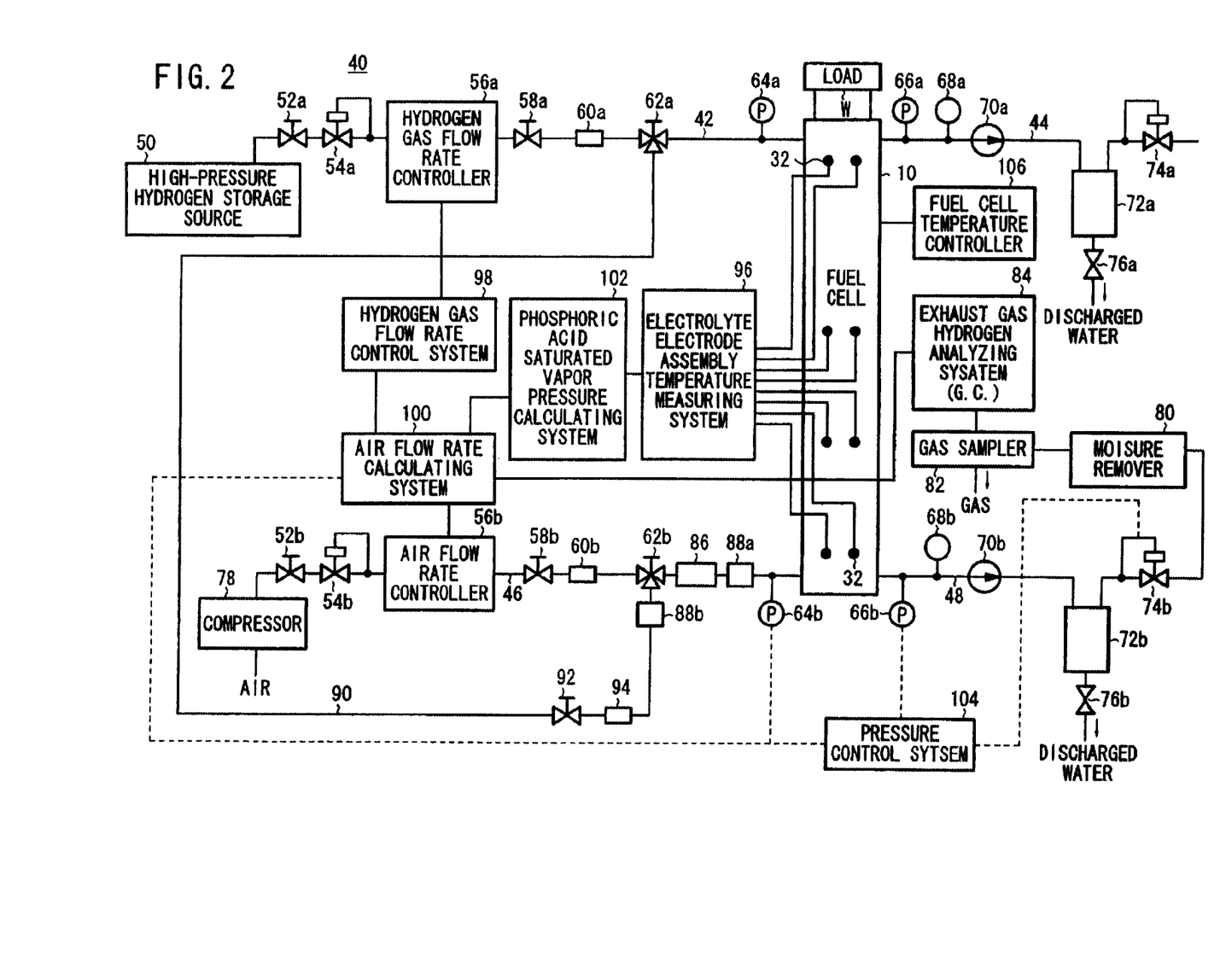
FIG. 2 is a schematic diagram, partly in block form, of a fuel cell system which incorporates the phosphoric acid fuel cell shown in FIG. 1.

FIG. 2 schematically shows, partly in block form, a fuel cell system 40 which incorporates the phosphoric acid fuel cell 10 shown in FIG. 1. The method of operating the phosphoric acid fuel cell 10 according to the present invention is carried out by the fuel cell system 40.

As shown in FIG. 2, a load W such as a motor is connected to the terminal plates 16a, 16b of the phosphoric acid fuel cell 10. To the phosphoric acid fuel cell 10, there are connected a hydrogen gas supply passage 42 and a hydrogen gas discharge passage 44 which are connected to the first gas passages 28, and an air supply passage 46 and an air discharge passage 48 which are connected to the second gas passages 30.

The hydrogen gas supply passage 42 is connected to a high-pressure hydrogen storage source 50 for supplying a hydrogen gas as a fuel gas under a high pressure, a solenoid-operated valve 52a, a pressure-reducing valve 54a, a hydrogen gas flow rate controller 56a, a shut-off valve 58a, a check valve 60a, a three-way valve 62a, and an inlet pressure sensor 64a, which are successively positioned in the order named from the upstream end at the high-pressure hydrogen storage source 50. The hydrogen gas discharge passage 44 is connected to an outlet pressure sensor 66a, a dew point sensor 68a, a heat exchanger 70a, a gas-liquid separator 72a, and a back pressure valve 74a, which are successively positioned in the order named from the upstream end as the outlet pressure sensor 66a. A solenoid-operated valve 76a is connected to the outlet of the gas-liquid separator 72a.

The air supply passage 46 and the air discharge passage 48 are connected to devices and instruments which are identical to those connected to the hydrogen gas supply passage 42 and the hydrogen gas discharge passage 44. Those identical devices and instruments are denoted by identical reference numerals with a suffix "b", and will not be described in detail below.

A compressor 78 for supplying air as an oxygen-containing gas is connected to the upstream end of the air supply passage 46. To the air discharge passage 48, there are connected a moisture remover 80, a gas sampler 82, and a gas chromatograph (GC) 84 as a hydrogen quantity analyzing system, which are successively positioned in the order named downstream of the back pressure valve 74b.

In the air supply passage 46, a gas mixer 86 and a back fire inhibitor 88a are interposed between the three-way valve 62b and the inlet pressure sensor 64b. The three-way valve 62a and the three-way valve 62b are interconnected by an air delivery pipe 90 having a shut-off valve 92 and a check valve 94. A back fire inhibitor 88b is interposed between the check valve 94 and the three-way valve 62b.

The temperature sensors 32 incorporated in the phosphoric acid fuel cell 10 are electrically connected to a temperature measuring system 96. The hydrogen gas flow rate controller 56a and the air flow rate controller 56b are electrically connected respectively to a hydrogen gas flow rate control system 98 and an air flow rate calculating system 100. The temperature measuring system 96 is electrically connected to a phosphoric acid saturated vapor pressure calculating system 102. The phosphoric acid saturated vapor pressure calculating system 102 and the gas chromatograph 84 are electrically connected to the air flow rate calculating system 100.

The air flow rate calculating system 100, the inlet pressure sensor 64b, the outlet pressure sensor 66b, and the back pressure valve 74b are electrically connected to a pressure control system 104.

The operating temperature of the fuel cell system 40, or stated otherwise, the temperature of the electrolyte electrode assembly 12, is controlled by a fuel cell temperature controller 106.

The method of operating the phosphoric acid fuel cell 10 according to the present invention will be described below with respect to operation of the fuel cell system 40 which is constructed as described above.

A reference phosphoric acid concentration which does not lower the cell characteristics of the phosphoric acid fuel cell 10 is affected by the internal structure and dimensions of the electrolyte electrode assembly 12, and is inherent in the phosphoric acid fuel cell 10. For carrying out the method of operating the phosphoric acid fuel cell 10 according to the present invention, various parameters including flow rates of a hydrogen gas and air that are supplied to the cathode 26 are determined in a test operation mode prior to a steady operation mode of the phosphoric acid fuel cell 10.

A mixed gas of a hydrogen gas and air is in an explosive range if the hydrogen gas exists in a volume % ranging from 4 to 75 volume %. The proportions of the hydrogen gas and air that are supplied to the cathode 26 are selected out of the above explosive range for safety purpose. Usually, a large amount of air is supplied such that the proportion of the hydrogen gas is less than 4 volume %. Such a large amount of air can easily be supplied by compressing atmospheric air with the compressor 78.

If the temperature of the phosphoric acid fuel cell 10 is increased by a mixed gas containing more than 75 volume % of a hydrogen gas, then when the phosphoric acid fuel cell 10 is operated in the steady operation mode (to generate electric energy) after the temperature of the phosphoric acid fuel cell 10 is increased, a hydrogen gas remaining at the cathode 26 and in the second gas passages 30 has to be purged by an inactive gas such as nitrogen or the like. This purging process is not required if the large amount of air is supplied as described above.

When the hydrogen gas and air are simultaneously supplied to the cathode 26, the reaction represented by the above formula (C) takes place at the cathode 26. If the air is supplied at a rate fc, the hydrogen gas is supplied at a rate fa, and the combustion efficiency is represented by r, then since the large amount of air is present, the amount m of generated water is determined by the following equation (1):

$$m(mol/min.) = \frac{fa}{22.4} \times \frac{r}{100} \quad (1)$$

where fc, fa have a unit of Nl/min., m has a unit of mol/min. Nl/min. refers to a flow rate at 0° C. and 1 atm as represented by liter (l).

If, the gas is discharged from the cathode 26 at a rate fec (Nl/min.), then since the rate fec represents the sum of the hydrogen gas and air that have passed through the cathode 26 without being involved in the reaction and the amount of generated water, the following equation (2) is satisfied:

$$fec = \left(fc - \frac{1}{2} \times fa \times \frac{r}{100}\right) + \left(fa - fa \times \frac{r}{100}\right) + m \times 22.4 \quad (2)$$

The saturated vapor pressure Psat of phosphoric acid at the time the amount of generated water and the amount of water in evaporated phosphoric acid are in equilibrium is expressed, using fec, m by the equation (3) shown below. In the equation (3), Pmix represents an inlet pressure of the mixed gas when it is introduced into the second gas passage 30, and is measured by the inlet pressure sensor 64b.

$$Psat = \frac{m \times 22.4}{fec} \times Pmix \quad (3)$$

From the equations (2), (3), the rate fc is expressed by the following equation (4):

$$fc = \frac{m \times 22.4 \times (Pmix - Psat)}{Psat} + \frac{3}{2} \times fa \times \frac{r}{100} - fa \quad (4)$$
$$= \frac{fa \times r \times (Pmix - Psat)}{Psat \times 100} + \frac{3}{2} \times fa \times \frac{r}{100} - fa$$

The parameters fc, fa, r, Psat, and Pmix are selected in order to satisfy the above equation (4).

The saturated vapor pressure Psat of phosphoric acid can be determined as follows:

A fuel cell system 40b which incorporates a preliminary phosphoric acid fuel cell 10b which is of the same dimensions and structure as the phosphoric acid fuel cell 10 is operated under conditions in which water is generated as water vapor and hence phosphoric acid is not dissolved, e.g., at a temperature of 160° C. with the hydrogen gas and air supplied under a pressure of 201.3 kPa and consumed at a ratio of 50%, and the voltage generated when the current density is 1 A/cm² is used as a reference voltage.

Then, the preliminary phosphoric acid fuel cell 10b is operated at a temperature of T° C. lower than 160° C. and other conditions identical to those described above, generating electric energy continuously for 3 hours at a constant current density of 0.2 A/cm². An amount of water for reducing the concentration of phosphoric acid is determined from the current density and the effective electrode area, and a ratio a of water evaporated from the anode, of the amount of water for reducing the concentration of phosphoric acid, is determined from measured values of the dew point sensors 68a, 68b. Thereafter, the preliminary phosphoric acid fuel cell 10b is operated at 160° C., and the performance of the phosphoric acid fuel cell 10 is evaluated to measure a voltage at the current density of 1 A/cm². It is confirmed whether or not the measured voltage is equal to or higher than the reference voltage.

The operating temperature is lowered, and the above measurement is repeated. After electric energy is generated at the low temperature, a temperature at which the phosphoric acid fuel cell 10 is operated when the voltage generated while the phosphoric acid fuel cell 10 is in the steady operation mode at 160° C. and the current density of 1 A/cm² is lower than the reference voltage is regarded as a threshold. The operating temperature at the time the phosphoric acid fuel cell 10 generates electric energy immediately before the temperature becomes the threshold is regarded as an operating temperature lower limit. Using the operating conditions at this time, a phosphoric acid saturated vapor pressure is calculated as follows:

When the current density is represented by I (A/cm$^2$) and the effective electrode area by S (cm$^2$), the amount of water generated per unit time, i.e., the amount m of water (mol/min.) for reducing the concentration of phosphoric acid, is constant regardless of the hydrogen gas consumption ratio ra (%) and the air consumption ratio rc (%), and is determined by the following equation (5):

$$m = I \times S \times \frac{60}{96500 \times 2} \quad (5)$$

Then, it is assumed that the operating temperature is represented by T° C., the hydrogen gas temperature by Ta° C., the air temperature by Tc° C., the operating pressure of the hydrogen gas system by Pa (kPa), the operating pressure of the oxidizing agent system by Pc (kPa), the rate at which the hydrogen gas is supplied (hydrogen gas flow rate) by fa (N1/min.), the rate at which the air is supplied (air flow rate) by fc (N1/min.), the rate at which the gas is discharged from the hydrogen gas system by fea (N1/min.), the rate at which the gas is discharged from the air system by fec (N1/min.), the ratio of water evaporated from the hydrogen gas system, of the amount of water for reducing the concentration of phosphoric acid, by a (%), and the ratio of water evaporated from the air system by 1-a (%).

The rate fea at which the gas is discharged from the hydrogen gas system is the sum of the rate of the hydrogen gas which is not consumed for generating electric energy and the amount of water vapor evaporated from the anode 24, of the amount of water for reducing the concentration of phosphoric acid. Therefore, the rate fea at which the gas is discharged from the hydrogen gas system is determined from the following equation (6):

$$fea = fa \times \frac{100 - ra}{100} + m \times \frac{a}{100} \times 22.4 \quad (6)$$

When both the hydrogen gas temperature Ta° C. and the air temperature Tc° C. are equal to the operating temperature T° C., the saturated vapor pressure Ps,a of phosphoric gas in the discharged hydrogen gas at the time the amount of generated water for reducing the concentration of phosphoric acid and the amount of water evaporated from the phosphoric acid are in equilibrium is determined by the following equation (7):

$$Ps, a = \frac{m \times \frac{a}{100} \times 22.4}{fea}$$

$$= \frac{m \times \frac{a}{100} \times 22.4}{fa \times \frac{100 - ra}{100} + m \times \frac{a}{100} \times 22.4} \times Pa \quad (7)$$

The rate fec at which air is discharged from the cathode is determined by the following equation (8):

$$fec = fc \times \left(0.21 \times \frac{100 - rc}{100} + 0.79\right) + m \times \frac{100 - a}{100} \times 22.4 \quad (8)$$

The saturated vapor pressure Ps,c of phosphoric acid in the discharged air is determined by the following equation (9):

$$Ps, c = \frac{m \times \frac{100 - a}{100} \times 22.4}{fec} \times Pc$$

$$= \frac{m \times \frac{100 - a}{100} \times 22.4}{fc \times \left(0.21 \times \frac{100 - rc}{100} + 0.79\right) + m \times \frac{100 - a}{100} \times 22.4} \times Pc \quad (9)$$

Therefore, if the operating temperature lower limit is 120° C., and the operating conditions include the ratio a of 20%, the current density I of 0.2 A/cm$^2$, the effective electrode area S of 196 cm$^2$, the hydrogen gas consumption ratio ra of 50%, the air consumption ratio rc of 50%, the hydrogen gas flow rate fa of 0.54 N1/min., the air flow rate fc of 1.33 N1/min., and the pressures Pa, Pc of 201.3 kPa at which the hydrogen gas and air are supplied, then the saturated vapor pressure Ps,a of phosphoric acid in the hydrogen gas is calculated as 33.6 kPa and the saturated vapor pressure Ps,c of phosphoric acid in the air is calculated as 31.8 kPa at the time the amount of generated water for reducing the concentration of phosphoric acid and the amount of water evaporated from the phosphoric acid are in equilibrium.

Figure 3:
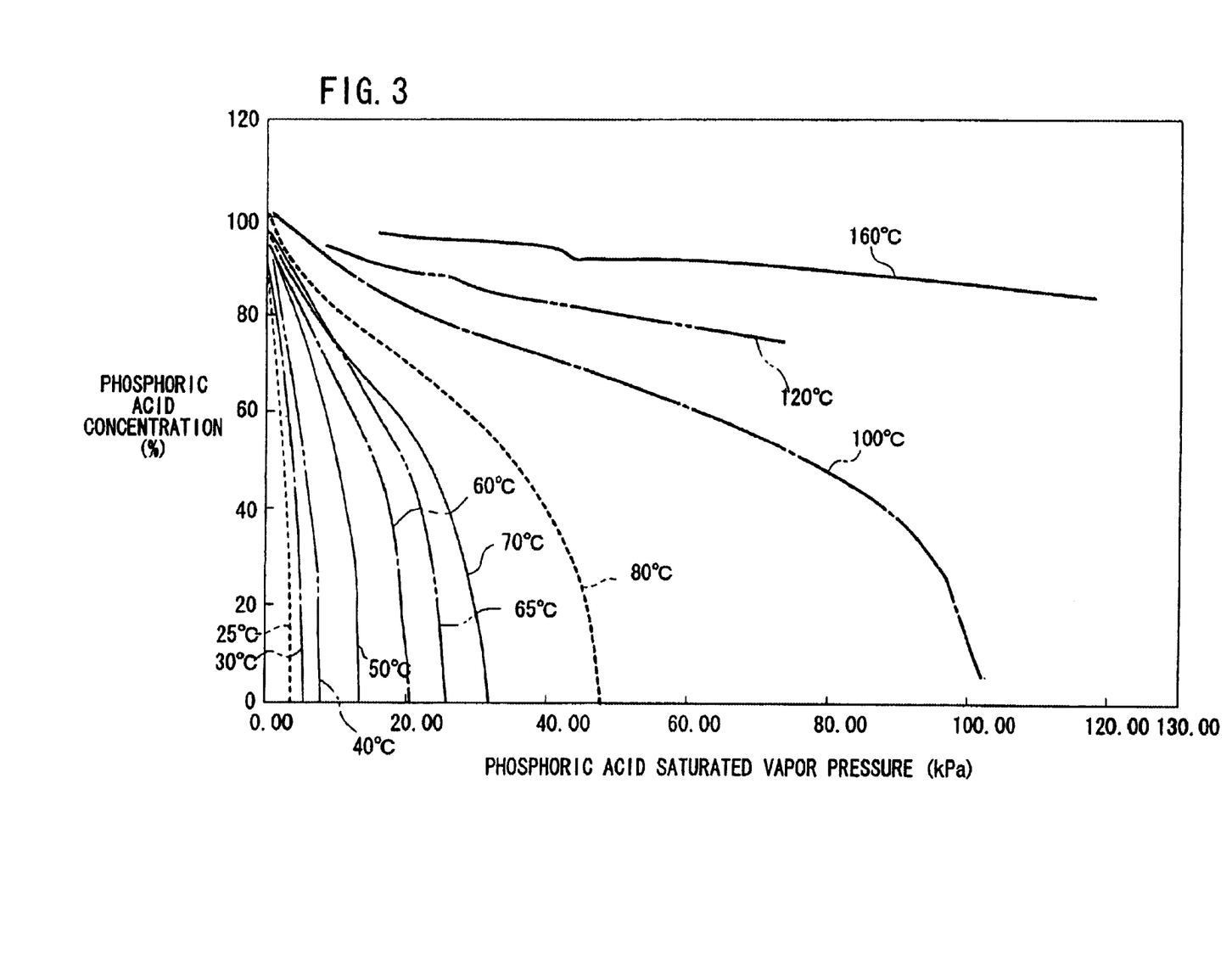
FIG. 3 is a graph showing the relationship between saturated vapor pressures of phosphoric acid and concentrations of phosphoric acid.
Figure 4:
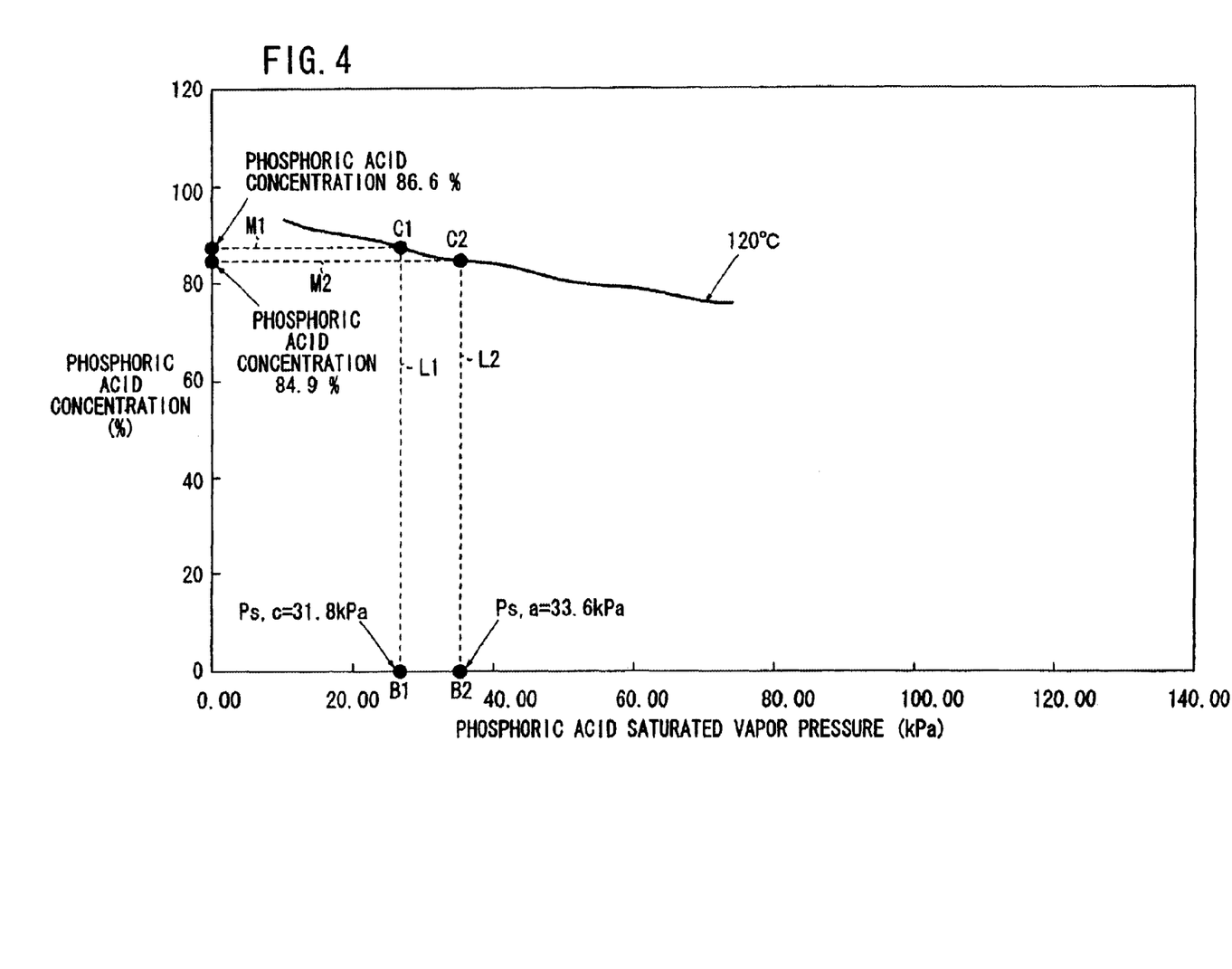
FIG. 4 is a diagram illustrative of a process of determining a concentration of phosphoric acid using the graph shown in FIG. 3.

The concentration of phosphoric acid at the above value of saturated vapor pressure is determined using the graph shown in FIG. 4. FIG. 4 illustrates only the phosphoric acid concentration vs. saturated vapor pressure curve at 120° C. shown in FIG. 3.

In FIG. 4, 31.8 kPa and 33.6 kPa which represent the values of Ps,c, Ps,a are plotted on the horizontal axis as indicated by points B1, B2. Then, perpendiculars L1, L2 are drawn from the points B1, B2 toward the phosphoric acid concentration vs. saturated vapor pressure curve. Points of intersection between the perpendiculars L1, L2 and the phosphoric acid concentration vs. saturated vapor pressure curve are indicated respectively C1, C2.

Then, straight lines M1, M2 are drawn from the respective points C1, C2 toward the vertical axis, and the values on the vertical axis where the straight lines M1, M2 cross the vertical axis are checked. These values on the vertical axis represent phosphoric acid concentrations at which a saturated vapor pressure is obtained for bringing the amount of generated water for reducing the concentration of phosphoric acid and the amount of water evaporated from the phosphoric acid into equilibrium.

In FIG. 4, the phosphoric acid concentration is 84.9% at the anode 24 and 86.6% at the cathode 26. Of these values, the lower one, i.e., 84.9%, is a lower limit for the phosphoric acid concentration at which the performance of the preliminary phosphoric acid fuel cell 10b (the phosphoric acid fuel cell 10). is not lowered.

The saturated vapor pressure Psat of phosphoric acid is determined as described below from the graph shown in FIG. 5 based on the phosphoric acid concentration determined as described above if the operating temperature (the temperature of the electrolyte electrode assembly 12) is 80°

C. FIG. 5 illustrates only the phosphoric acid concentration vs. saturated vapor pressure curve at 80° C. shown in FIG. 3.

Figure 5:
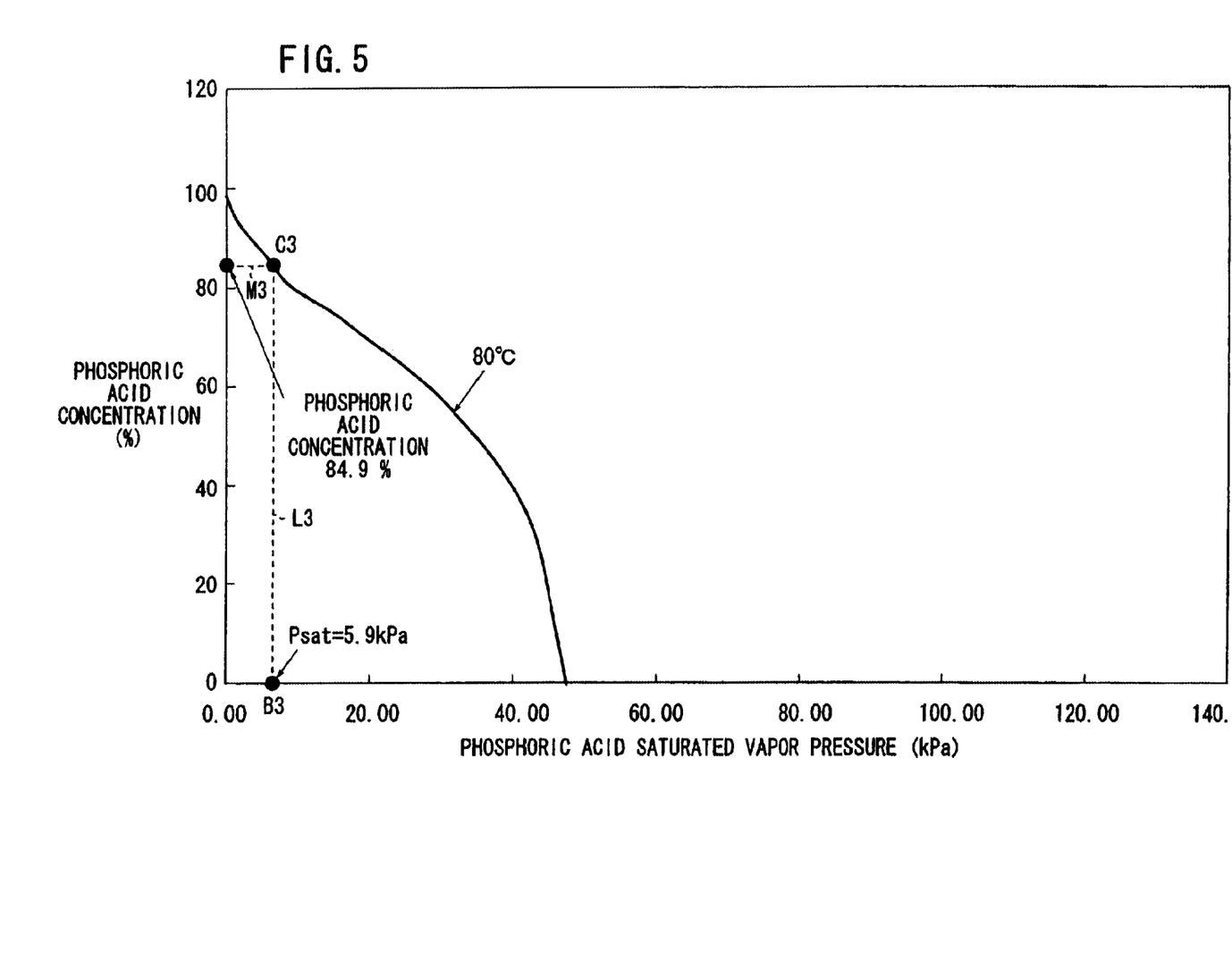
FIG. 5 is a diagram illustrative of a process of determining a saturated vapor pressure of phosphoric acid using the graph shown in FIG. 3.

A straight line M3 is drawn horizontally from the value of 84.9% on the vertical axis shown in FIG. 5 toward the phosphoric acid concentration vs. saturated vapor pressure curve. Then, a perpendicular L3 is drawn from appoint C3 of intersection between the straight line M3 and the phosphoric acid concentration vs. saturated vapor pressure curve toward the horizontal axis. A point of intersection between the perpendicular L3 and the horizontal axis represented by B3. The point B3 of intersection represents Psat at 80° C., and has a value of 5.9 kPa.

Then, the inlet pressure Pmix is measured by the inlet pressure sensor 64b. The value of the inlet pressure Pmix should preferably be as small as possible in order to allow the generated water to evaporate as much as possible. Specifically, the outlet passage may be vented to the atmosphere to equalize the outlet pressure to the atmospheric pressure.

The rate fa and the combustion efficiency r are experimentally determined as follows:

A heat capacity required to increase the temperature of the electrolyte electrode assembly 12 to the operating temperature is determined from the specific heat of the electrolyte electrode assembly 12 and the difference between the temperature of the electrolyte electrode assembly 12 at the time it starts to be heated and the temperature of the electrolyte electrode assembly 12 at the time the heating ends, and the determined heat capacity is divided by the heating time, thus determining a required heat capacity Q1 (kJ/min.) per unit time.

If an initial hydrogen gas flow rate is represented by fa1 (Nl/min.), then since the combustion energy produced at the time 1 mol of hydrogen gas is combusted is 228.6 kJ, the heat capacity Q1 is expressed by the following equation (10):

$$Q1 = \frac{fa1}{22.4} \times \frac{r}{100} \times 228.6 \quad (10)$$

where r represents the combustion efficiency defined by the equation (1), and has a unit of %. The equation (10) is modified into the following equation (11):

$$fa1 = Q1 \times 22.4 \times \frac{100}{r} \times \frac{1}{228.6} \quad (11)$$

Now, it is assumed that r is 100%, and the value of Q1 determined as described above is put into the equation (11), determining fa1. The determined value of fa1 is supplied to the hydrogen gas flow rate control system 98.

Separately from the above process, the lower limit for the phosphoric acid concentration at which the performance of the preliminary phosphoric acid fuel cell 10b (the phosphoric acid fuel cell 10) is not lowered, i.e., 84.9%, and the phosphoric acid concentration vs saturated vapor pressure curves at the respective temperatures shown in FIG. 3 are stored in the phosphoric acid saturated vapor pressure calculating system 102. The temperature sensor 32 and the temperature measuring system 96 measure a temperature TMEA1 (° C.) of the electrolyte electrode assembly 12 at the time it starts being heated. The temperature measuring system 96 sends a signal representative of the measured temperature to the phosphoric acid saturated vapor pressure calculating system 102.

In response to the supplied signal, the phosphoric acid saturated vapor pressure calculating system 102 calculates a phosphoric aid saturated vapor pressure Psat1 at the temperature TMEA1 (° C.) of the phosphoric acid at the concentration of 84.9% from the phosphoric acid concentration vs. saturated vapor pressure curve, and sends a signal representative of the calculated phosphoric aid saturated vapor pressure Psat1 to the air flow rate calculating system 100.

The inlet pressure Pmix is measured by the inlet pressure sensor 64b. The inlet pressure Pmix should preferably be as small as possible for the reason of facilitating the evaporation of generated water. Therefore, the pressure control system 104 fully opens the back pressure valve 74b to make the cathode outlet pressure close to the atmospheric pressure.

The values fa1, r (=100%), Psat1, Pmix thus determined are put into the equation (4), thus calculating an initial air flow rate fc1.

The three-way value 62a is operated to prevent the hydrogen gas from flowing to the anode 24, and the hydrogen gas and air are passed through the second gas passages 30 in the cathode 26 at respective rates fc1, fa1, causing the reaction represented by the formula (C) to take place at the cathode 26. Since this reaction is an exothermic reaction, the temperature of the electrolyte electrode assembly 12 rises as the reaction is in progress.

After t1 minutes, a saturated vapor pressure Psat1,t1 of phosphoric acid at the concentration of 84.9% in the electrolyte electrode assembly 12 whose temperature has been increased to TMEA,t1 (° C.) is determined using FIG. 3 (the phosphoric acid concentration vs. saturated vapor pressure curves). A pressure Pmix,t1 of the mixed gas introduced to the cathode 26 is measured by the inlet pressure sensor 64b.

The gas discharged from the cathode 26 is cooled by the heat exchanger 70b. The generated water which is condensed from the discharged gas is separated from the gas by the gas-liquid separator 72b.

The gas from which the generated water is separated passes through the back pressure valve 74b into the moisture remover 80. The moisture remover 80 removes a remaining moisture from the gas, turning the gas into a dry gas. A portion of the dry gas is sampled by the gas sampler 82, and the amount of a hydrogen gas contained in the dry gas is measured by the gas chromatograph 84. The determined amount of the hydrogen gas contained in the dry gas is the amount of the hydrogen gas which is discharged from the cathode 26 without being involved in the reaction. An actual combustion efficiency rrea,t1 can be calculated from this amount of the hydrogen gas.

The above values fa1, rrea,t1, Psat1,t1, Pmix,t1 are put into the equation (4), thus calculating a secondary air flow rate fc1,t1.

The hydrogen gas and air are passed at respective rates fa1, fc1,t1 through the cathode 26, causing the reaction represented by the above formula (C) to progress at the cathode 26 thereby to raise again the temperature of the electrolyte electrode assembly 12.

Then, in the same manner as described above, a temperature TMEA,t2 (° C.) of the electrolyte electrode assembly 12 after t2 minutes is measured, and a saturated vapor pressure Psat1,t2 of phosphoric acid at the concentration of 84.9% is determined using FIG. 3. A pressure Pmix,t2 of the mixed gas introduced to the cathode 26 is measured by the inlet pressure sensor 64b.

An amount of hydrogen gas discharged from the cathode 26 without being involved in the reaction is determined, and an actual combustion efficiency rrea,t2 is determined.

The above values fa1, rrea,t2, Psat1,t2, Pmix,t2 are put into the equation (4), thus calculating a tertiary air flow rate fc1,t2.

The hydrogen gas and air are passed at respective rates fa1, fc1,t2 through the cathode 26, causing the reaction represented by the above formula (C) to progress at the cathode 26 thereby to raise again the temperature of the electrolyte electrode assembly 12.

In this manner, the temperature of the electrolyte electrode assembly 12, the pressure of the supplied mixed gas, and the amount of hydrogen gas which is not combusted are monitored, and the monitored values are fed back to change the air flow rate and at the same time increase the temperature of the electrolyte electrode assembly 12. Finally, a combustion efficiency at the time the temperature of the electrolyte electrode assembly 12 has reached the operating temperature of the fuel cell system 40 is represented by rreal.

If the temperature-rising characteristics of the electrolyte electrode assembly 12 thus obtained are lower than desired temperature-rising characteristics, then the hydrogen gas flow rate is set to fa2 which is slightly higher than fa1, and the above process is repeated. For calculating the air flow rate, the value of rreal is used as an initial combustion efficiency. At this time, a combustion efficiency at the time the temperature of the electrolyte electrode assembly 12 has reached the operating temperature of the fuel cell system 40 is represented by rrea2.

If the temperature-rising characteristics of the electrolyte electrode assembly 12 are still lower than the desired temperature-rising characteristics, then the hydrogen gas flow rate is set to fa3 which is slightly higher than fa2, and the above process is repeated. For calculating the air flow rate, the value of rrea2 is used as an initial combustion efficiency. Finally, a hydrogen gas flow rate and a combustion efficiency at the time the actual temperature-rising characteristics of the electrolyte electrode assembly 12 are in conformity with the desired temperature-rising characteristics are represented by fa and r, respectively.

The fuel cell system 40 is operated based on the determined parameters as follows:

First, the values of fa, r are input to the air flow rate calculating system 100. The phosphoric acid concentration vs. saturated vapor pressure curves at the respective temperatures shown in FIG. 3 are stored in the phosphoric acid saturated vapor pressure calculating system 102.

The three-way valve 62a is operated to introduce the hydrogen gas into only the cathode 26, and the temperature sensor 32 and the temperature measuring system 96 measure a temperature TMEA1 (° C.) of the electrolyte electrode assembly 12 at the time it starts being heated. The temperature measuring system 96 sends a signal representative of the measured temperature to the phosphoric acid saturated vapor pressure calculating system 102.

In response to the supplied signal, the phosphoric acid saturated vapor pressure calculating system 102 calculates a phosphoric aid saturated vapor pressure Psat1 at the temperature TMEA1 (° C.) of the phosphoric acid at the concentration of 84.9% from the phosphoric acid concentration vs. saturated vapor pressure curve, sends a signal representative of the calculated phosphoric aid saturated vapor pressure Psat1 to the air flow rate calculating system 100.

Then, the pressure control system 104 fully opens the back pressure valve 74b in order to lower the cathode outlet pressure as much as possible. The inlet pressure Pmix at this time is measured by the inlet pressure sensor 64b, which sends a signal representative of the measured inlet pressure Pmix to the pressure control system 104. The pressure control system 104 sends the supplied signal to the air flow rate calculating system 100.

The air flow rate calculating system 100 calculates an air flow rate fc1 according to the equation (4) from the supplied values of fa, r, the calculated phosphoric aid saturated vapor pressure Psat1, and the inlet pressure Pmix detected by the pressure control system 104, and sends a signal representative of the calculated airflow rate fc1 to the air flow rate controller 56b. Thus, the cathode 26 is supplied with the hydrogen gas at the rate fa and the air at the rate fc1.

The temperature of the electrolyte electrode assembly 12 is increased by the heat which is generated by the chemical reaction represented by the formula (C) that is caused by the hydrogen gas and air supplied to the cathode 26. At the same time, $H_2O$ is generated.

Subsequently, after t minutes, a temperature TMEA,t of the electrolyte electrode assembly 12 and a pressure Pmix,t at which the mixed gas is supplied to the inlet of the cathode 26 are detected in real-time. The phosphoric acid saturated vapor pressure calculating system 102 calculates a phosphoric acid saturated vapor pressure Psat,t after t minutes based on the temperature TMEA,t.

The air flow rate calculating system 100 calculates a required air flow rate fc,t according to the equation (4) from the supplied values of fa, r, the calculated phosphoric aid saturated vapor pressure Psat,t, and the inlet pressure Pmix,t detected by the pressure control system 104. The air flow rate calculating system 100 then controls the air flow rate to become fc,t with the air flow rate controller 56b.

With the operating method according to the present embodiment, even if water generated by the reaction is highly likely to be present as liquid water and hence the hydrogen gas and oxygen in the air react with each other at a temperature for lowering the concentration of phosphoric acid to increase the amount of phosphoric acid, the air flow rate is controlled to bring the phosphoric acid concentration at the time the amount of generated water for reducing the concentration of phosphoric acid and the amount of water evaporated from the phosphoric acid are in equilibrium, to a value equal to or higher than the reference phosphoric acid concentration which does not lower the performance level of the fuel cell, i.e., keeps the fuel cell at a desired performance level.

According to the present embodiment, therefore, the temperature of the fuel cell 10 can be increased without using a heater having a large heat-generating capability. Therefore, additional facilities including a large-size heater and an individual phosphoric acid supply device are not required, and it is possible to increase the temperature of the fuel cell system 40 to the operating temperature with a simple and economic arrangement while preventing the electric energy generating capacity and the fuel cell performance from being unduly lowered.

After the temperature of the electrolyte electrode assembly 12 has risen to a predetermined temperature range from about 140° C. to about 190° C., the three-way valve 62a is operated to stop supplying the hydrogen gas to the cathode 26 and supply the hydrogen gas to the first gas passages 28 of the anode 24. The cathode 26 is continuously supplied with air.

At the anode 24, electrons are generated by the reaction represented by the formula (A). The generated electrons are supplied as electric energy for energizing the load W such as a motor electrically connected to the terminal plates 16a, 16b, and then reach the cathode 26 where they are involved in the reaction represented by the formula (B). Stated otherwise, the load W is energized as the fuel cell system 40 generates electric energy.

As described above, the temperature of the phosphoric acid fuel cell 10 is increased up to an operating temperature at which the concentration of phosphoric acid is equal to or higher than the reference phosphoric acid concentration. Therefore, the phosphoric acid fuel cell 10 can generate electric energy with desired characteristics.

In the above embodiment, the hydrogen gas is used as the fuel gas. However, any gases which contain hydrogen may be used as the fuel gas. Similarly, while the air is used as the oxygen-containing gas in the above embodiment, any gases containing oxygen, or oxygen itself, may be used as the oxygen-containing gas.

In the above embodiment, the phosphoric acid fuel cell 10 is shown as a single unit cell. However, a plurality of unit cells may be stacked into a phosphoric acid fuel cell.

Although a certain preferred embodiment of the present invention has been shown and described in detail, it should be understood that various changes and modifications may be made therein without departing from the scope of the appended claims.

What is claimed is:

1. A method of operating a phosphoric acid fuel cell having an assembly including an anode, a cathode, and an electrolyte layer impregnated with phosphoric acid and interposed between said anode and said cathode, said method comprising the steps of:

before generating electric energy from said phosphoric acid fuel cell, supplying a fuel gas and an oxygen-containing gas to said cathode to raise the temperature of said assembly to an operating temperature with heat generated by a reaction between hydrogen contained in said fuel gas and oxygen contained in said oxygen-containing gas at said cathode; and before generating electric energy from said phosphoric acid fuel cell, causing said hydrogen and said oxygen to react with each other at said cathode under a condition in which the concentration of the phosphoric acid at the time the amount of water generated by the reaction and the amount of water evaporated from the phosphoric acid impregnated in said electrolyte layer are in equilibrium is equal to or greater than a reference phosphoric acid concentration which is capable of keeping the phosphoric acid fuel cell at a predetermined performance level.

2. A method according to claim 1, wherein said fuel gas and said oxygen-containing gas are supplied to said cathode at respective proportions to keep said hydrogen and said oxygen out of an explosive range.

3. A method according to claim 2, wherein said fuel gas and said oxygen-containing gas are supplied such that the oxygen contained in said oxygen-containing gas is excessive compared with the hydrogen contained in said hydrogen-containing gas.

4. A method according to claim 1, wherein said concentration of the phosphoric acid is controlled so as to be equal to or greater than said reference phosphoric acid concentration by changing a rate at which said oxygen-containing gas is supplied.

5. A method according to claim 4, wherein said fuel gas and said oxygen-containing gas are supplied such tat the oxygen contained in said oxygen-containing gas is excessive compared with the hydrogen contained in said hydrogen-containing gas.

6. A method according to claim 1, wherein said electrolyte layer comprises a basic polymeric membrane.

7. A method according to claim 6, wherein said electrolyte layer is made of polybenzimidazole.

* * * * *